US012465554B2

(12) United States Patent
Kondo et al.

(10) Patent No.: US 12,465,554 B2
(45) Date of Patent: Nov. 11, 2025

(54) CHEMICAL AGENT SUPPLY DEVICE AND CHEMICAL AGENT SUPPLY METHOD

(71) Applicant: PHC Holdings Corporation, Tokyo (JP)

(72) Inventors: Akira Kondo, Gunma (JP); Hiroshi Hama, Saitama (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 281 days.

(21) Appl. No.: 18/108,399

(22) Filed: Feb. 10, 2023

(65) Prior Publication Data

US 2023/0181426 A1 Jun. 15, 2023

Related U.S. Application Data

(63) Continuation of application No. PCT/JP2021/031580, filed on Aug. 27, 2021.

(30) Foreign Application Priority Data

Oct. 27, 2020 (JP) ................................ 2020-179599

(51) Int. Cl.
*A61J 7/00* (2006.01)
*B65B 1/30* (2006.01)
*B65B 61/02* (2006.01)

(52) U.S. Cl.
CPC ............... *A61J 7/0084* (2013.01); *B65B 1/30* (2013.01); *B65B 61/025* (2013.01)

(58) Field of Classification Search
CPC .. A61J 3/06; A61J 7/0084; B65B 9/08; B65B 1/30; B65B 61/025

(Continued)

(56) References Cited

U.S. PATENT DOCUMENTS 4,018,358 A * 4/1977 Johnson .............. G07F 11/1657 221/13
4,664,289 A * 5/1987 Shimizu .............. G07F 17/0092 439/43

(Continued)

FOREIGN PATENT DOCUMENTS

CN 118159240 A * 6/2024 ......... B65D 81/3283
DE 10109063 A1 * 9/2002 ......... B65D 81/3283

(Continued)

OTHER PUBLICATIONS

International Search Report dated Nov. 16, 2021 issued in International Patent Application No. PCT/JP2021/031580, with English translation.

(Continued)

*Primary Examiner* — Rakesh Kumar

(74) *Attorney, Agent, or Firm* — Rimon P.C.

(57) ABSTRACT

A drug supply device includes: a plurality of cassettes configured to eject a drug one by one; and a control device configured to set a plurality of groups including a plurality of cassettes selected from among the plurality of cassettes. The control device selects a cassette that performs a drug ejection operation from each of the plurality of groups such that a number of tablets of a drug to be ejected from the plurality of cassettes that perform the drug ejection operation is each levelled in one of the plurality of group and among the plurality of groups.

9 Claims, 10 Drawing Sheets

(58) Field of Classification Search
USPC .............................................................. 221/1
See application file for complete search history.

(56) References Cited

U.S. PATENT DOCUMENTS

| | | | | | |
|---|---|---|---|---|---|
| 4,697,721 | A * | 10/1987 | Johnson | B65B 57/20 | 221/241 |
| 4,928,473 | A * | 5/1990 | Nagao | B65B 43/465 | 53/53 |
| 5,405,048 | A * | 4/1995 | Rogers | B65G 1/1373 | 221/17 |
| 5,709,063 | A * | 1/1998 | Yuyama | B65B 5/103 | 53/154 |
| RE35,743 | E * | 3/1998 | Pearson | G07F 9/002 | 221/9 |
| 5,725,125 | A * | 3/1998 | Bessette | G01F 11/029 | 222/144.5 |
| 5,787,678 | A * | 8/1998 | Koike | B65B 39/002 | 221/124 |
| 6,085,938 | A * | 7/2000 | Coughlin | G07F 11/44 | 221/277 |
| 6,216,418 | B1 * | 4/2001 | Kim | B65B 39/002 | 53/131.5 |
| 6,349,848 | B1 * | 2/2002 | Uema | G07F 11/44 | 221/124 |
| 6,561,377 | B1 * | 5/2003 | Pearson | G07F 11/1657 | 221/13 |
| 6,644,504 | B2 * | 11/2003 | Yuyama | B65B 5/103 | 221/92 |
| 7,174,693 | B2 * | 2/2007 | Wooldridge | B65B 5/103 | 221/12 |
| RE40,453 | E * | 8/2008 | Lasher | G07F 9/001 | 53/411 |
| 7,412,302 | B2 * | 8/2008 | Cobb | G07F 11/44 | 700/231 |
| 7,455,163 | B2 * | 11/2008 | Yuyama | B65B 35/04 | 53/154 |
| 7,861,492 | B2 * | 1/2011 | Yuyama | G07F 17/0092 | 221/9 |
| 7,912,582 | B1 * | 3/2011 | Holtje | G07F 11/165 | 700/242 |
| 8,054,086 | B2 * | 11/2011 | Rivenbark, Jr. | G07F 11/165 | 211/1 |
| 8,499,967 | B2 * | 8/2013 | Michelli | G07F 11/32 | 211/1 |
| 8,579,153 | B2 * | 11/2013 | Yuyama | G07F 11/18 | 221/202 |
| 8,777,054 | B2 * | 7/2014 | Young | B65D 83/04 | 221/209 |
| 9,493,290 | B2 * | 11/2016 | Yuyama | G07F 11/18 | |
| 10,614,916 | B1 * | 4/2020 | Einav | G16H 10/60 | |
| 11,613,389 | B2 * | 3/2023 | Lebel | B65B 5/106 | 53/55 |
| 11,661,277 | B2 * | 5/2023 | Cross | B65G 1/1373 | 700/215 |
| 12,187,474 | B2 * | 1/2025 | Lokkers | B65B 9/06 | |
| 2002/0007868 | A1 * | 1/2002 | Kodama | B65B 5/103 | 221/257 |
| 2003/0074868 | A1 * | 4/2003 | Yasuoka | G07F 11/10 | 53/493 |
| 2004/0176873 | A1 * | 9/2004 | Kim | G07F 11/62 | 700/231 |
| 2006/0006190 | A1 * | 1/2006 | Janet | G07F 17/0092 | 221/211 |
| 2006/0230710 | A1 * | 10/2006 | Ishiwatari | B65B 61/26 | 53/493 |
| 2007/0150092 | A1 * | 6/2007 | Ohmura | G07F 7/1025 | 700/231 |
| 2008/0011764 | A1 * | 1/2008 | Geltser | A61J 7/02 | 221/1 |
| 2008/0083769 | A1 * | 4/2008 | Yuyama | G07F 11/165 | 221/124 |
| 2008/0110555 | A1 * | 5/2008 | Bouchelle | B65C 9/32 | 156/230 |
| 2008/0110921 | A1 * | 5/2008 | DuMond | G07F 17/0092 | 221/76 |
| 2008/0168751 | A1 * | 7/2008 | Sink | B65B 7/2835 | 53/367 |
| 2008/0283549 | A1 * | 11/2008 | Dummer | G07F 17/0092 | 221/174 |
| 2009/0039097 | A1 * | 2/2009 | Farnsworth | G07F 17/0092 | 221/200 |
| 2009/0087522 | A1 * | 4/2009 | Casey | A23L 33/17 | 426/106 |
| 2009/0112361 | A1 * | 4/2009 | Berg | G07F 9/002 | 700/231 |
| 2011/0139814 | A1 * | 6/2011 | Mueller | B65B 3/12 | 222/255 |
| 2014/0138398 | A1 * | 5/2014 | Daniels | B65D 83/04 | 221/202 |
| 2014/0353327 | A1 * | 12/2014 | Bae | G07F 17/0092 | 221/12 |
| 2016/0304229 | A1 * | 10/2016 | Hellenbrand | B65B 9/08 | |
| 2017/0190558 | A1 * | 7/2017 | Ubidia | B67D 1/1231 | |
| 2017/0348194 | A1 * | 12/2017 | Duda | A61J 7/0084 | |
| 2018/0194505 | A1 * | 7/2018 | Amano | B65D 83/04 | |
| 2021/0101703 | A1 | 4/2021 | Ueta | | |
| 2021/0225118 | A1 * | 7/2021 | Bouchelle | G07F 11/42 | |
| 2023/0020340 | A1 * | 1/2023 | Brakkee | A61J 7/0084 | |
| 2023/0181426 | A1 * | 6/2023 | Kondo | B65B 5/103 | 221/1 |

FOREIGN PATENT DOCUMENTS

| | | | | | |
|---|---|---|---|---|---|
| JP | S60225561 | A * | 11/1985 | A61J 3/00 |
| JP | H0651101 | U * | 7/1994 | A61J 3/00 |
| JP | H07-035301 | A | 6/1995 | |
| JP | 08-005443 | A | 1/1996 | |
| JP | WO-2019244878 | A1 * | 12/2019 | A61J 3/00 |
| WO | WO-2013062580 | A1 * | 5/2013 | G01N 35/1074 |
| WO | 2019/244878 | A1 | 12/2019 | |
| WO | WO-2025053087 | A1 * | 3/2025 | A61J 3/00 |

OTHER PUBLICATIONS

European Office Action dated Jul. 8, 2024 issued in the corresponding European Patent Application No. 21885677.1.

* cited by examiner

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 1 | 15 |
| DRUG B | 10 | 2 | 4 | 1 | 10 |
| DRUG C | 5 | 3 | 4 | 1 | 5 |
| DRUG D | 1 | – | – | – | – |
| DRUG E | 1 | – | – | – | – |
| DRUG F | 1 | – | – | – | – |
| DRUG G | 1 | – | – | – | – |
| DRUG H | 1 | – | – | – | – |

FIG. 4

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 2 | 7.5 |
| DRUG B | 10 | 2 | 4 | 1 | 10 |
| DRUG C | 5 | 3 | 4 | 1 | 5 |

FIG. 5A

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG B | 10 | 2 | 4 | 1 | 10 |
| DRUG A | 15 | 1 | 4 | 2 | 7.5 |
| DRUG C | 5 | 3 | 4 | 1 | 5 |

FIG. 5B

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG B | 10 | 2 | 4 | 2 | 5 |
| DRUG A | 15 | 1 | 4 | 2 | 7.5 |
| DRUG C | 5 | 3 | 4 | 1 | 5 |

FIG. 5C

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 2 | 7.5 |
| DRUG B | 10 | 2 | 4 | 2 | 5 |
| DRUG C | 5 | 3 | 4 | 1 | 5 |

FIG. 5D

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 3 | 5 |
| DRUG B | 10 | 2 | 4 | 2 | 5 |
| DRUG C | 5 | 3 | 4 | 1 | 5 |

FIG. 5E

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 4 | 3.75 |
| DRUG B | 10 | 2 | 4 | 2 | 5 |
| DRUG C | 5 | 3 | 4 | 1 | 5 |

FIG. 5F

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG B | 10 | 2 | 4 | 2 | 5 |
| DRUG C | 5 | 3 | 4 | 1 | 5 |
| DRUG A | 15 | 1 | 4 | 4 | 3.75 |

FIG. 5G

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG B | 10 | 2 | 4 | 3 | 3.3 |
| DRUG C | 5 | 3 | 4 | 1 | 5 |
| DRUG A | 15 | 1 | 4 | 4 | 3.75 |

FIG. 5H

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG C | 5 | 3 | 4 | 1 | 5 |
| DRUG A | 15 | 1 | 4 | 4 | 3.75 |
| DRUG B | 10 | 2 | 4 | 3 | 3.3 |

FIG. 5I

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG C | 5 | 3 | 4 | 2 | 2.5 |
| DRUG A | 15 | 1 | 4 | 4 | 3.75 |
| DRUG B | 10 | 2 | 4 | 3 | 3.3 |

FIG. 5J

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 4 | 3.75 |
| DRUG B | 10 | 2 | 4 | 3 | 3.3 |
| DRUG C | 5 | 3 | 4 | 2 | 2.5 |

FIG. 5K

INFORMATION TABLE T1

| DRUG NAME | NUMBER OF TABLETS | GROUP NUMBER | MAXIMUM NUMBER OF CASSETTES | NUMBER OF ALLOCATED CASSETTES | AVERAGE VALUE |
|---|---|---|---|---|---|
| DRUG A | 15 | 1 | 4 | 4 | 3.75 |
| DRUG B | 10 | 2 | 4 | 4 | 2.5 |
| DRUG C | 5 | 3 | 4 | 2 | 2.5 |

FIG. 5L

INFORMATION TABLE T2

| DRUG NAME | GROUP NUMBER | CASSETTE NUMBER | | | |
|---|---|---|---|---|---|
| | | 1 | 2 | 3 | 4 |
| DRUG A | 1 | 4 | 4 | 4 | 3 |
| DRUG B | 2 | 3 | 3 | 2 | 2 |
| DRUG C | 3 | 3 | 2 | – | – |

CHEMICAL AGENT SUPPLY DEVICE AND CHEMICAL AGENT SUPPLY METHOD

CROSS-REFERENCE OF RELATED APPLICATIONS

This application is a Continuation of International Patent Application No. PCT/JP2021/031580, filed on Aug. 27, 2021, which in turn claims the benefit of Japanese Patent Application No. 2020-179599, filed on Oct. 27, 2020, the entire disclosures of which Applications are incorporated by reference herein.

TECHNICAL FIELD

The present disclosure relates to a drug supply device and a drug supply method.

BACKGROUND ART

PTL 1 discloses a drug supply device in which drugs specified in the prescription are ejected from a plurality of cassettes housed in a plurality of respective shelves arranged in the up-down direction and left-right direction, and the ejected drugs are divided by collecting them at a hopper disposed below the shelves.

Since the cassette ejects the drug one by one, the time for supplying the drugs per package increases as the number of the drugs of the same type specified per package increases. In view of this, in the related art, a group is set by grouping the plurality of cassettes for storing the drug of the same type, and a plurality of the drugs of the same type are simultaneously ejected from the group in order to reduce the time for supplying the drugs.

CITATION LIST

Patent Literature

PTL 1

Japanese Examined Utility Model Publication No. H7-35301

SUMMARY OF INVENTION

Technical Problem

However, in the above-described drug supply device, when the total number of cassettes for which the drug ejection operation can be performed per package is limited, a plurality of groups are set, and consequently the number of tablets of the drug to be ejected from a single cassette is relatively increased, the time for supplying the drug is relatively increased.

An object of the present disclosure is to reduce the time for supplying the drug in a drug supply device.

Solution to Problem

To achieve the above-mentioned object, a drug supply device of the present disclosure includes: a plurality of cassettes configured to eject a drug one by one; and a control device configured to set a plurality of groups including a plurality of cassettes selected from among the plurality of cassettes. The control device selects a cassette that performs a drug ejection operation from each of the plurality of groups such that a number of tablets of a drug to be ejected from the plurality of cassettes that perform the drug ejection operation is each levelled in one of the plurality of group and among the plurality of groups.

Advantageous Effects of Invention

With the drug supply device of the present disclosure, it is possible to reduce the time for supplying the drug.

BRIEF DESCRIPTION OF DRAWINGS

FIG. 4 is a diagram illustrating an information table;

FIG. 5A is a diagram illustrating an information table;

FIG. 5B is a diagram illustrating an information table;

FIG. 5C is a diagram illustrating an information table;

FIG. 5D is a diagram illustrating an information table;

FIG. 5E is a diagram illustrating an information table;

FIG. 5F is a diagram illustrating an information table;

FIG. 5G is a diagram illustrating an information table;

FIG. 5H is a diagram illustrating an information table;

FIG. 5I is a diagram illustrating an information table;

FIG. 5J is a diagram illustrating an information table;

FIG. 5K is a diagram illustrating an information table;

FIG. 5L is a diagram illustrating an information table;

DESCRIPTION OF EMBODIMENTS

Drug supply device 1 according to an embodiment of the present disclosure is described below with reference to the drawings. Note that in the following description, the upper side and lower side in FIG. 1 are the upper side and lower side of drug supply device 1, the left side and right side thereof are the left side and right side of drug supply device 1, and the lower left side and upper right side thereof are the front side and rear side of drug supply device 1.

Figure 1:
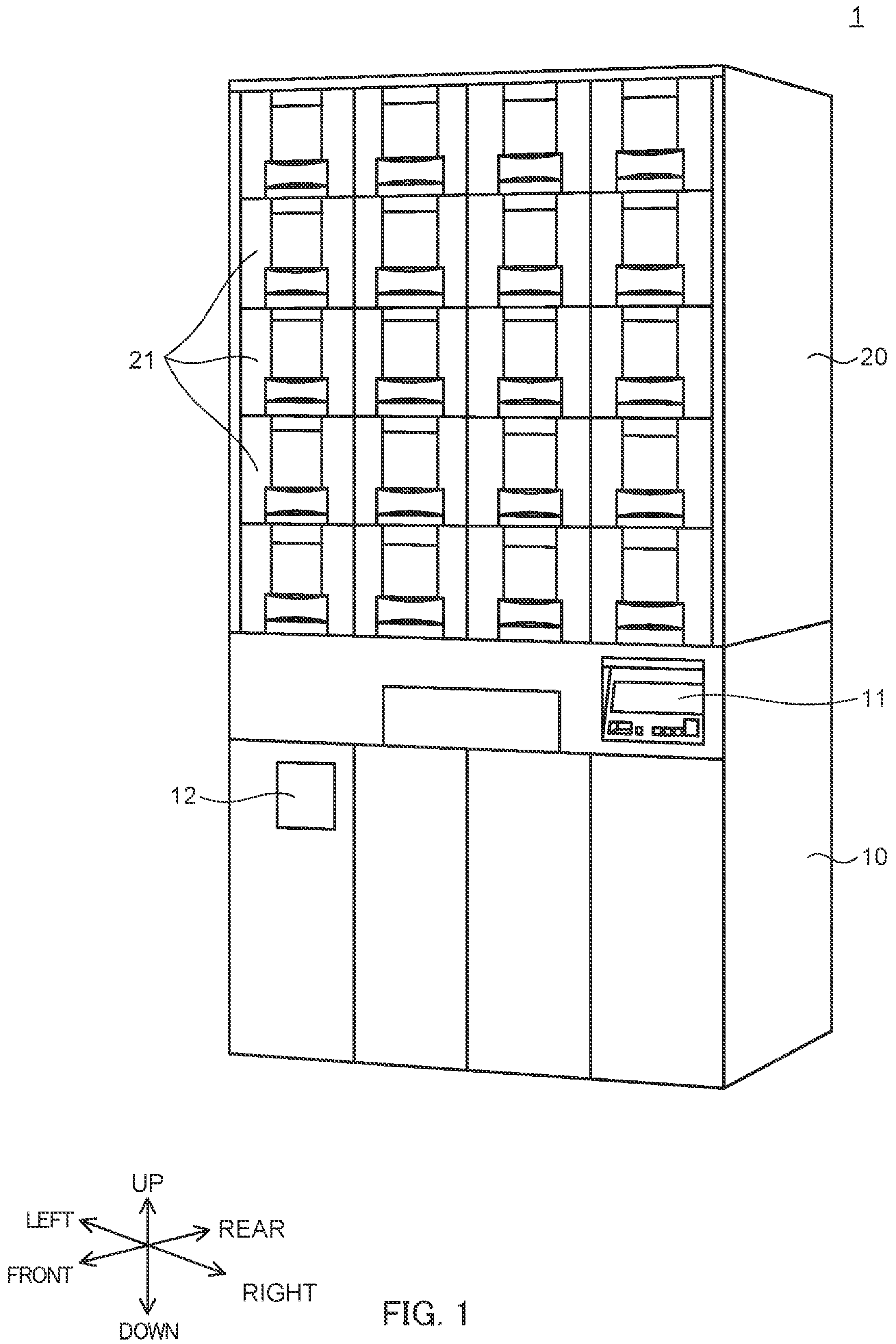
FIG. 1 is a perspective view of a drug supply device according to an embodiment of the present disclosure.

FIG. 1 is a perspective view illustrating an exemplary drug supply device 1. Drug supply device 1 includes first floor section 10 and second floor section 20.

First floor section 10 includes operation unit 11 and take-out part 12. In addition, first floor section 10 includes an input unit (not illustrated in the drawing).

Operation unit 11 is a device operated by the operator and includes a display, an operation button and the like, for example. When operation unit 11 is operated by the user, a variety of information is input to drug supply device 1.

Drugs divided in drug supply device 1 are taken out from take-out part 12. Take-out part 12 includes an opening, and the user takes out drugs from the opening.

The input unit is an input device to which a variety of information is input from an external device. The input unit is connected to a personal computer, and information about prescriptions issued by medical institutions is input from the personal computer, for example.

Second floor section 20 includes a plurality of shelves 21 that respectively store a plurality of cassettes C. Second floor section 20 includes 20 shelves 21. The plurality of shelves 21 are disposed in five rows in the up-down direction and four columns in the left-right direction. Note that the number and arrangement of shelves 21 provided in second floor section 20 are not limited to the present embodiment, and the number of rows in the upper and lower direction and/or the number of columns in the left and right direction may be greater or smaller than the above-described numbers.

Figure 2:
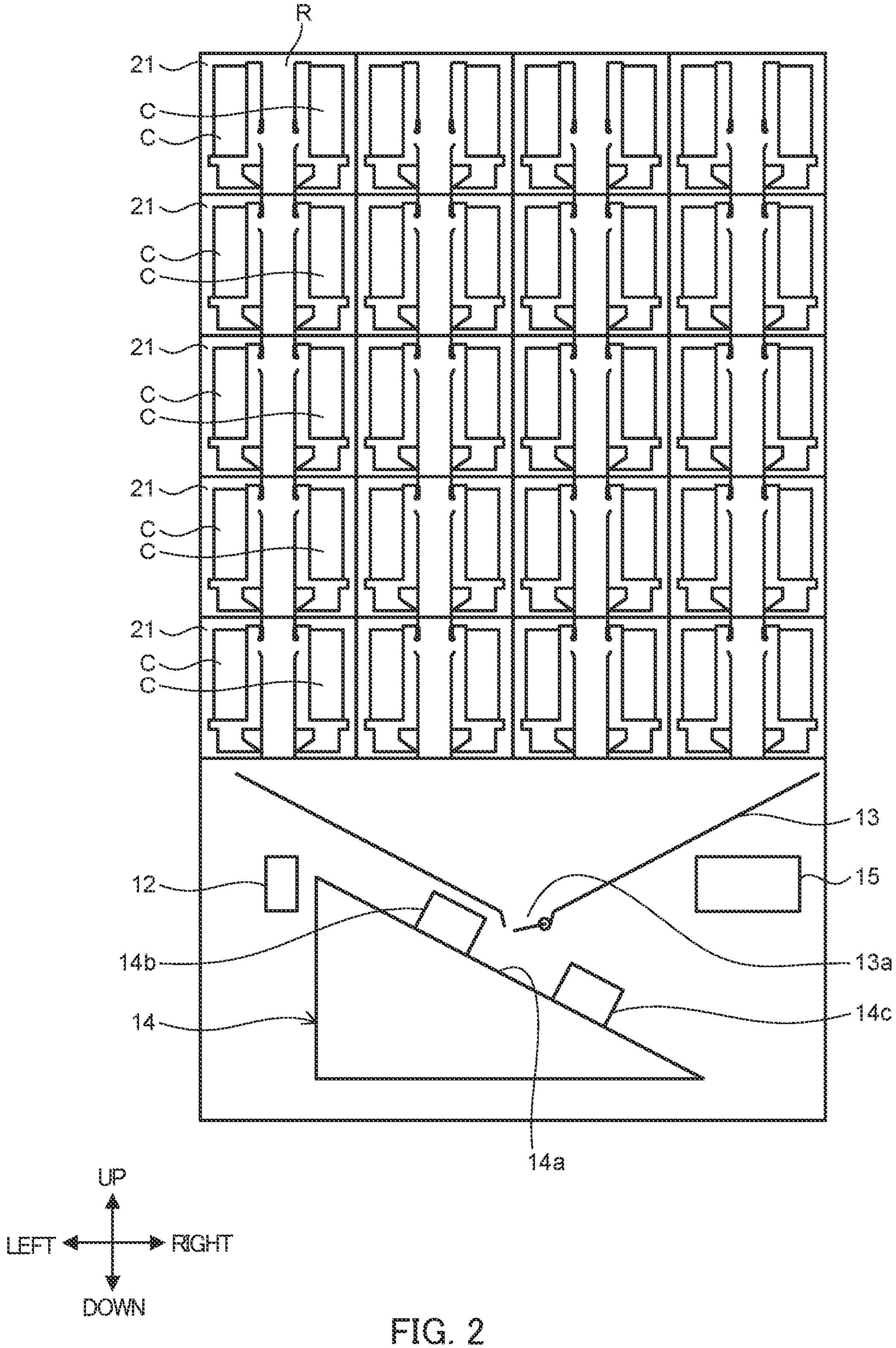
FIG. 2 is a longitudinal sectional view of the drug supply device.

Next, internal structures of second floor section 20 and first floor section 10 are described below with reference to FIG. 2.

In each of the plurality of shelves 21, the plurality of cassettes C are stored along the front-rear direction on both sides in the left-right direction in shelf 21. A plurality of drugs is stored in each cassette C. A drug of one type is stored in one of the plurality of cassettes C. The type of the drug stored in cassettes C different from each other in the plurality of cassettes C may be identical to or different from each other. Each of the plurality of cassettes C is configured to eject the stored drug one by one.

The drug ejected from cassette C falls down passage R and is guided to first floor section 10. Passage R extends through each of the plurality of shelves 21 in the up-down direction.

Next, first floor section 10 is described. First floor section 10 includes collection part 13, packaging unit 14, and control device 15.

Collection part 13 receives the drug guided to first floor section 10, and guides the received drug to packaging unit 14 from outlet 13*a*. Outlet 13*a* is provided at an approximately center portion of collection part 13. Collection part 13 is a hopper, for example.

Packaging unit 14 packages the drug guided to collection part 13. Packaging unit 14 includes conveyance part 14*a*, printer 14*b*, and sealing device 14*c*.

From a roller (not illustrated in the drawing) on which belt-shaped folded packaging paper is wound, conveyance part 14*a* feeds the packaging paper, and conveys the fed packaging paper to sealing device 14*c* side, for example. The drug guided from collection part 13 is put on the packaging paper and carried toward sealing device 14*c* together with the packaging paper.

Printer 14*b* is a printer for printing the patient's name, the name of the drug supplied to the packaging paper, the dose date and time and the like on the surface of the packaging paper fed from the roller, for example.

Sealing device 14*c* is a device that seals the packaging paper in which the drug is packaged.

The packaging paper in which the drug is sealed is cut at a predetermined timing, and conveyed by a predetermined device toward take-out part 12, for example.

Control device 15 is a computer that centrally controls drug supply device 1. Control device 15 includes a memory unit storing a predetermined program. Control device 15 acquires information input to the input unit, and controls a drug ejection operation of the plurality of cassettes C stored in each shelf 21 on the basis of the acquired information and the program (details are described later). The drug ejection operation is an operation of ejecting drugs by cassette C.

Control device 15 includes a memory unit (not illustrated in the drawing). In the memory unit, information about the plurality of cassettes C in each shelf 21 is stored. The information of cassette C is the type (e.g., drug name) of the drug stored in cassette C, the installed position of cassette C, the number of remaining drugs stored in cassette C, and the like. The number of remaining drugs is calculated by subtracting the number of tablets of the ejected drug from the number of tablets at the time point when the drug is supplied to cassette drug C input from operation unit 11 or the input unit, each time cassette C performs the drug ejection operation.

In addition, control device 15 selects the plurality of cassettes C on the basis of a predetermined condition and sets the group in advance with the selected cassettes C. Control device 15 sets a plurality of groups. The group is set on the basis of information input from operation unit 11 or the input unit. Drug location information representing the position of cassette C and the type of drug to be stored thereto is input from operation unit 11 or the input unit.

The group is set on the basis of the drug location information, i.e., the drug type and the installed position of cassette C. One group is composed of cassettes C for storing the drug of the same type. For example, the first group includes four cassettes C for storing a drug with a name "drug A".

In addition, control device 15 may set one group by selecting a plurality of cassettes C stored in one shelf 21. In other words, the plurality of cassettes C making up one of a plurality of groups may be selected from the plurality of cassettes C stored in one shelf 21. In addition, control device 15 may set another one group by selecting a plurality of cassettes C stored in different shelves 21. In other words, the plurality of cassettes C making up one of the plurality of groups may be selected to include one or more cassettes C stored in one shelf 21 and one or more cassettes C stored in another shelf.

After setting the group, control device 15 allocates a group number to the set group. Control device 15 causes the memory unit to map and store the group number and the installed positions of cassettes C included in the group with the group number.

Next, the program to be executed by control device 15 when dividing the drug, and a process of control device 15 to select cassette C that performs the drug ejection operation are described with reference to the drawings.

Figure 3:
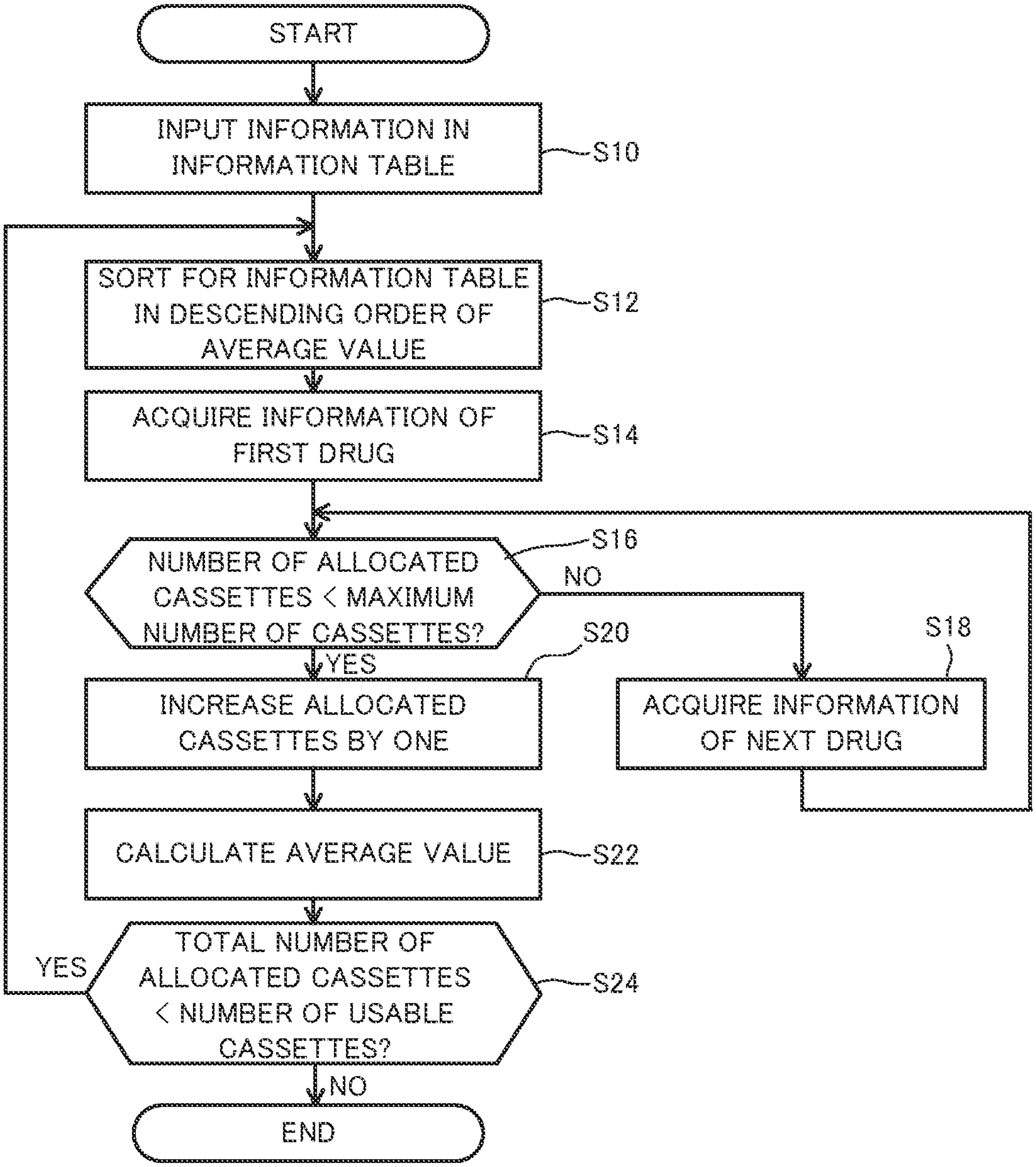
FIG. 3 is a flowchart of a program executed by a control device.

When information about a medical prescription is input from the input unit, control device 15 executes a program of the flowchart illustrated in FIG. 3, for example. The information about a medical prescription includes the drug type (e.g., drug name) included in one package and the number of tablets of each drug.

Control device 15 inputs information to information table T1 at S3 illustrated in FIG. 3. Information table T1 is temporarily generated in the memory unit when a program is executed. Information table T1 maps the drug name, the number of tablets, the group number, the maximum number of cassettes, the number of allocated cassettes, and the average value (FIG. 4).

The drug name and the number of tablets are drug information per package input from the input unit. The drug information per package is, for example, information representing 15 tablets for the drug with a name "drug A", 10 tablets for the drug with a name "drug B", five tablets for the drug with a name "drug C", and one tablet for each of the drugs with names "drug D", "drug E", "drug F", "drug G" and "drug H". When such information is input from the input unit, the drug name and the number of tablets are input to information table T1 as illustrated in FIG. 4.

In addition, when the drug name of the drug stored in cassette C included in the group set in advance is input, control device 15 inputs the group number of that group in the column of the group number corresponding to the input drug name. In addition, control device 15 inputs the total number of cassettes C included in that group in the column of the maximum number of cassettes corresponding to the input drug name.

For example, in the case where the first group is composed of four cassettes C in which "drug A" is stored, "1" is input to the group number corresponding to "drug A", and "4" is input to the maximum number of cassettes corresponding to "drug A" in information table T1. In addition, in the case where the second group is composed of four cassettes C in which "drug B" is stored, "2" is input to the group number corresponding to "drug B", and "4" is input to the maximum number of cassettes corresponding to "drug B" in information table T1. Further, in the case where the third group is composed of four cassettes C in which "drug C" is stored, "3" is input to the group number corresponding to "drug C", and "4" is input to the maximum number of cassettes corresponding to "drug C" in information table T1.

The number of allocated cassettes is the number of cassettes C that perform the drug ejection operation among one of a plurality of groups. At S10, "1" is input as an initial value of the number of allocated cassettes. Details of the setting of the number of allocated cassettes are described later.

The average value is an input value that is input when the drug name of the drug stored in cassette C included in the group set in advance is input, and an average value of the number of tablets to be ejected per package by cassette C that performs the drug ejection operation in this group. That is, the average value is a value obtained by dividing the value of the column of the number of tablets of information table T1 by the value of the column of the number of allocated cassettes.

Note that when the drug name of the drug stored in cassette C that is not included in the group set in advance is input, no information is input in the columns of the group number, the maximum number of cassettes, the number of allocated cassettes, and the average value corresponding to that drug name. The mark "-" shown in the cells of information table T1 indicates that there is no information input.

In information table T1 illustrated in FIG. 4, "1" as an initial value is input for the number of allocated cassettes. In addition, the cassette ejects drug C one by one as described above. Thus, in the case where control device 15 causes the plurality of cassettes C to perform the drug ejection operation on the basis of information table T1 illustrated in FIG. 4, one cassette C in the first group ejects "drug A" 15 times, one cassette C in the second group ejects "drug B" ten times, and one cassette C in the third group ejects "drug C" five times. In addition, cassettes C that store "drug D", "drug E", "drug F", "drug G" and "drug H" each eject the drug one time.

In information table T1 illustrated in FIG. 4, cassette C that ejects "drug A" is largest in the number of times (15 times) of the drug ejection operation. On the other hand, after a set number of tablets are ejected, cassettes C that eject other drugs do not perform the drug ejection operation until all "drugs A" have been ejected. Thus, the time for which "drug A" is ejected 15 times corresponds to the time for which drugs per package is ejected. That is, to reduce the drug ejection time per package, it is preferable to reduce the maximum number of times of the drug ejection operation of cassette C.

To reduce the maximum number of times of the drug ejection operation of cassette C, it is preferable to increase the number of allocated cassettes for cassettes C making up the group. When the number of allocated cassettes is increased, the average value is reduced, and thus the maximum number of times of the drug ejection operation of cassette C is reduced. The number of allocated cassettes can be increased up to the maximum number of cassettes. However, in some cases the number of allocated cassettes may not be increased up to the maximum number of cassettes for all drugs. The reason for this is that in drug supply device 1, the maximum number of cassettes C that can perform the drug ejection operation per package is set.

Now, the total number of allocated cassettes in the case where the maximum number of cassettes C that can perform the drug ejection operation per package is set to 15 is described below. As illustrated in FIG. 3, in the case where "drug D", "drug E", "drug F", "drug G" and "drug H" not set to group are set to one tablet, cassettes C that respectively perform the drug ejection operation for "drug D", "drug E", "drug F", "drug G" and "drug H", i.e., a total of five cassettes C are required. Accordingly, in the case where the maximum number of cassettes C that can perform the drug ejection operation per package is 15, the maximum total number of cassettes C that can perform the drug ejection operation for "drug A", "drug B" and "drug C" set to the groups is 10 obtained by subtracting 5 from 15. That is, the total number of allocated cassettes of "drug A", "drug B" and "drug C" set to groups is limited to 10.

That is, control device 15 sets the number of allocated cassettes to reduce the drug ejection time per package in the state where the total number of allocated cassettes is limited. More specifically, in accordance with the following program, control device 15 sets the number of allocated cassettes such that the number of allocated cassettes is increased from the initial value, and that the average value calculated in accordance with the increase of the number of allocated cassettes is levelled among the plurality of groups.

A case where control device 15 sets the number of allocated cassettes in the state where the total number of allocated cassettes is limited to 10 in information input information table T1 illustrated in FIG. 4 is described below.

At S12, control device 15 sorts the information of the drug set to the group in descending order of the average value in information table T1. In information table T1 illustrated in FIG. 4, the average value is arranged in descending order. As such, information table T1 is not sorted, and kept in the state illustrated in FIG. 4. Subsequently, at S14, control device 15 acquires the information about the first drug. More specifically, control device 15 acquires the information corresponding to "drug A" located at the top in information table T1 of FIG. 4.

Further, at S16, control device 15 determines whether the number of allocated cassettes in the acquired drug information is smaller than the maximum number of cassettes. The number of allocated cassettes "1" of "drug A" acquired is smaller than the maximum number of cassettes "4". In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5A, control device 15 inputs "2" in the number of allocated cassettes of "drug A", and "7.5" (=number of tablets (=15)/number of allocated cassettes (=2)) to the average value. Note that in information table T1 illustrated in FIGS. 5A to 5L, only drugs with names "drug A", "drug B" and "drug C" are illustrated for convenience of description.

Subsequently, at S24, control device 15 determines whether the total number of allocated cassettes is smaller than the number of usable cassettes. The number of usable cassettes is a value obtained by subtracting the number of cassettes C that eject drug not set to group from the maximum number of cassettes C that can perform the drug ejection operation per package.

As described above, the maximum number of cassettes C that can perform the drug ejection operation per package is 15, and the number of cassettes that eject the drugs not set to group ("drug D", "drug E", "drug F", "drug G" and "drug H") is 5. Accordingly, the number of usable cassettes is 10. At the time point when information table T1 is in the state illustrated in FIG. 5A, the total number of allocated cassettes is 4 (=2+1+1), which is smaller than the number of usable cassettes.

In this case (YES at S24), control device 15 returns the program back to S12, and sorts the information of the drug set to the group in descending order of the average value in information table T1. More specifically, since the average value of "drug A" has become "7.5", information table T1 is sorted as "drug B", "drug A" and "drug C" in this order from the top as illustrated in FIG. 5B.

Subsequently, at S14, control device 15 acquires the information about the first drug. More specifically, control device 15 acquires information corresponding to "drug B" located at the top in information table T1 of FIG. 5B.

The acquired number of allocated cassettes "1" of the "drug B" is smaller than the maximum number of cassettes "4". In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5C, control device 15 inputs "2", increased by one, to the number of allocated cassettes of "drug B", and inputs "5" (=number of tablets (=10)/number of allocated cassettes (=2)) to the average value.

At the time point when information table T1 is in the state illustrated in FIG. 5C, the total number of allocated cassettes is 5 (=2+2+1), which is smaller than the number of usable cassettes (=10). In this case (YES at S24), control device 15 returns the program back to S12, and sorts the information of the drug set to the group in descending order of the average value in information table T1. More specifically, since the average value of "drug B" has become "5", the top of information table T1 becomes "drug A" as illustrated in FIG. 5D. In addition, "drug B" and "drug C" have the same average value. When the average value is the same, information table T1 is sorted in accordance with the order of the first sorting. Specifically, information table T1 is sorted as "drug A", "drug B" and "drug C" in this order from the top.

Subsequently, at S14, control device 15 acquires the information about the first drug. More specifically, control device 15 acquires the information corresponding to "drug A" located at the top in information table T1 of FIG. 5D.

The number of allocated cassettes "2" of "drug A" acquired is smaller than the maximum number of cassettes "4". In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5E, control device 15 inputs "3", increased by one, to the number of allocated cassettes of "drug A" and inputs "5" (=number of tablets (=15)/number of allocated cassettes (=3)) to the average value.

At the time point when information table T1 is in the state illustrated in FIG. 5E, the total number of allocated cassettes is 6 (=3+2+1), which is smaller than the number of usable cassettes (=10). In this case (YES at S24), control device 15 returns the program back to S12, and sorts the information of the drug set to the group in descending order of the average value in information table T1. In information table T1 illustrated in FIG. 5E, all average values are the same, and arranged in the order of the first sorting. Accordingly, information table T1 is kept in the state illustrated in FIG. 5E without being sorted.

Subsequently, at S14, control device 15 acquires the information about the first drug. More specifically, control device 15 acquires the information corresponding to "drug A" located at the top in information table T1 of FIG. 5E.

The number of allocated cassettes "3" of "drug A" acquired is smaller than the maximum number of cassettes "4". In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5F, control device 15 inputs "4", increased by one, to the number of allocated cassettes of "drug A", and inputs "3.75" (=number of tablets (=15)/number of allocated cassettes (=4)) to the average value.

At the time point when information table T1 is in the state illustrated in FIG. 5F, the total number of allocated cassettes is 7 (=4+2+1), which is smaller than the number of usable cassettes (=10). In this case (YES at S24), control device 15 returns the program back to S12, and sorts the information of the drug set to the group in descending order of the average value in information table T1. More specifically, since the average value of "drug A" has become "3.75", information table T1 is sorted as "drug B", "drug C" and "drug A" in this order from the top as illustrated in FIG. 5G.

Subsequently, at S14, control device 15 acquires the information about the first drug. More specifically, control device 15 acquires information corresponding to "drug B" located at the top in information table T1 of FIG. 5G.

The number of allocated cassettes "2" of "drug B" acquired is smaller than the maximum number of cassettes "4". In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5H, control device 15 inputs "3", increased by one, to the number of allocated cassettes of "drug B", and inputs "3.3" (=number of tablets (=10)/number of allocated cassettes (=3)) to the average value.

At the time point when information table T1 is in the state illustrated in FIG. 5H, the total number of allocated cassettes is 8 (=3+1+4), which is smaller than the number of usable cassettes (=10). In this case (YES at S24), control device 15 returns the program back to S12, and sorts the information of the drug set to the group in descending order of the average value in information table T1. More specifically, since the average value of "drug B" has become "3.3", information table T1 is sorted as "drug C", "drug A" and "drug B" in this order from the top as illustrated in FIG. 5I.

Subsequently, at S14, control device 15 acquires the information about the first drug. More specifically, control device 15 acquires information corresponding to "drug C" located at the top in information table T1 of FIG. 5I.

The number of allocated cassettes "1" of "drug C" acquired is smaller than the maximum number of cassettes "4". In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5J, control device 15 inputs “2”, increased by one, to the number of allocated cassettes of “drug C”, and inputs “2.5” (=number of tablets (=5)/number of allocated cassettes (=2)) to the average value.

At the time point when information table T1 is in the state illustrated in FIG. 5J, the total number of allocated cassettes is 9 (=2+4+3), which is smaller than the number of usable cassettes (=10). In this case (YES at S24), control device 15 returns the program back to S12, and sorts the information of the drug set to the group in descending order of the average value in information table T1. More specifically, since the average value of “drug C” has become “2.5”, information table T1 is sorted as “drug A”, “drug B” and “drug C” in this order from the top as illustrated in FIG. 5K.

Subsequently, at S14, control device 15 acquires the information about the first drug. More specifically, control device 15 acquires the information corresponding to “drug A” located at the top in information table T1 of FIG. 5K.

The number of allocated cassettes “4” of “drug A” acquired is the same as the maximum number of cassettes “4”. In this case (NO at S16), at S18, control device 15 acquires the information about the next drug. More specifically, control device 15 acquires the information corresponding to “drug B” located after “drug A” in information table T1 of FIG. 5K.

Subsequently, at S16, control device 15 determines whether the number of allocated cassettes in the acquired drug information is smaller than the maximum number of cassettes. The number of allocated cassettes “3” of “drug B” acquired is smaller than the maximum number of cassettes “4”. In this case (YES at S16), the process proceeds to S20, and control device 15 increases the acquired the number of allocated cassettes of the drug by one. Subsequently, the process proceeds to S22, and control device 15 calculates the average value. More specifically, as in information table T1 illustrated in FIG. 5L, control device 15 inputs “4”, increased by one, to the number of allocated cassettes of “drug B”, and inputs “2.5” (=number of tablets (=10)/number of allocated cassettes (=4)) to the average value.

At the time point when information table T1 is in the state illustrated in FIG. 5L, the total number of allocated cassettes is 10 (=4+4+2), which is the same as the number of usable cassettes (=10). In this case (NO at S24), control device 15 terminates the program. The number of allocated cassettes and the average value program are determined to be the values at the time point of the completion, i.e., the values input in information table T1 illustrated in FIG. 5L. The average value at the time point of the completion of the program is levelled among the plurality of groups.

Further, in response to the completion of the above-described program, control device 15 selects cassette C that performs the drug ejection operation and determines the number of tablets of the drug to be ejected from the selected cassette C, for each of the plurality of groups.

Figure 6:
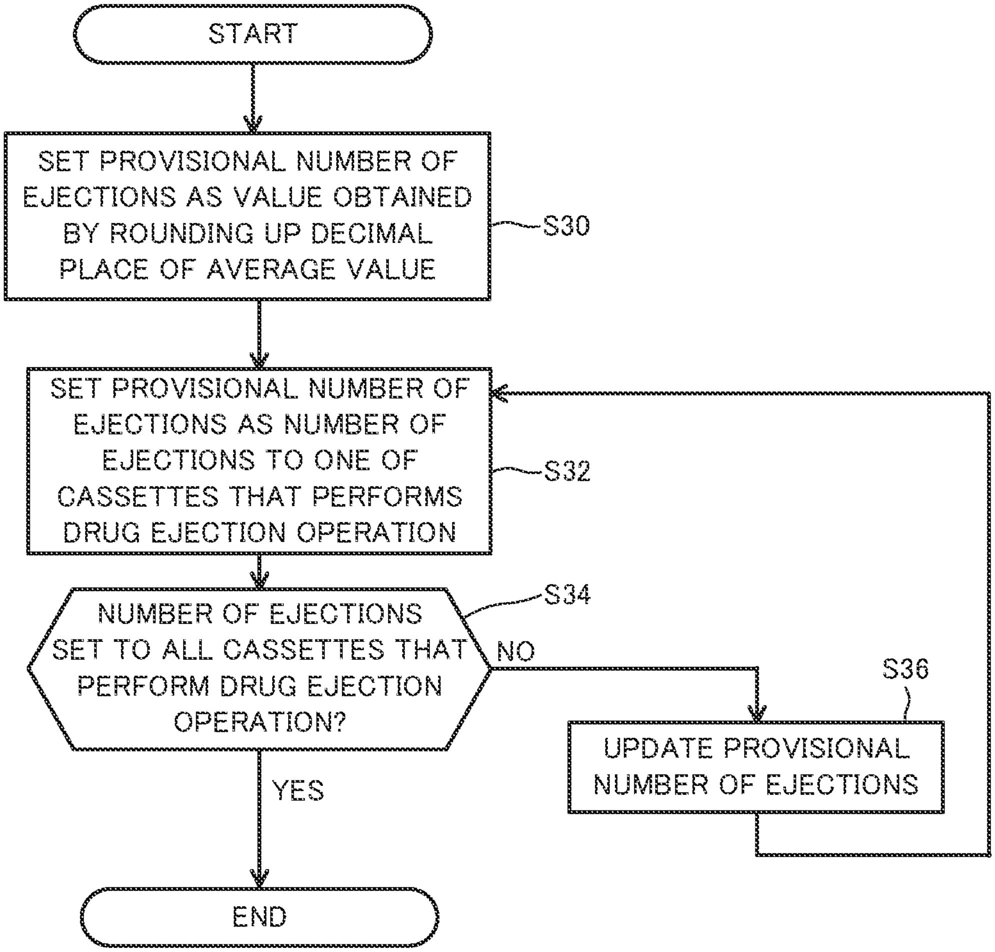
FIG. 6 is a flowchart of a program executed by the control device.

Control device 15 sets the number of tablets of the drug to be ejected from cassette C that performs the drug ejection operation in a levelled manner in one of the plurality of groups on the basis of the average value levelled among the plurality of groups. Specifically, control device 15 selects cassettes C that perform the drug ejection operation such that the number of tablets of the drug to be ejected from the plurality of cassettes that perform the drug ejection operation is each levelled among one of the plurality of groups and among the plurality of groups. More specifically, control device 15 executes the program illustrated in the flowchart illustrated in FIG. 6 for each group.

First, control device 15 executes a program for the first group. At S30, control device 15 acquires the average value of the first group from information table T1, and sets a provisional number of ejections as a value obtained by rounding up the decimal place of the acquired average value. Since “drug A” of the first group has an average value of “3.75” (see FIG. 5L), “4” as a value obtained by rounding up the decimal place is the provisional number of ejections.

Subsequently, at S32, control device 15 sets the provisional number of ejections as the number of ejections to one of cassettes C that performs the drug ejection operation in the first group. A cassette number is assigned to each of the plurality of cassettes C making up the group. As cassette C to which the number of ejections is to be set, cassette C with the smallest cassette number is selected from among cassettes C provided with no number of ejections. Note that naturally, cassette C to which the number of ejections is to be set is not limited to cassette C with the smallest cassette number among cassettes C provided with no number of ejections. For example, as cassette C to which the number of ejections is to be set, cassette C with the largest cassette number may be selected or cassette C may be selected at random among cassettes C provided with no number of ejections.

Figures 7, 8:
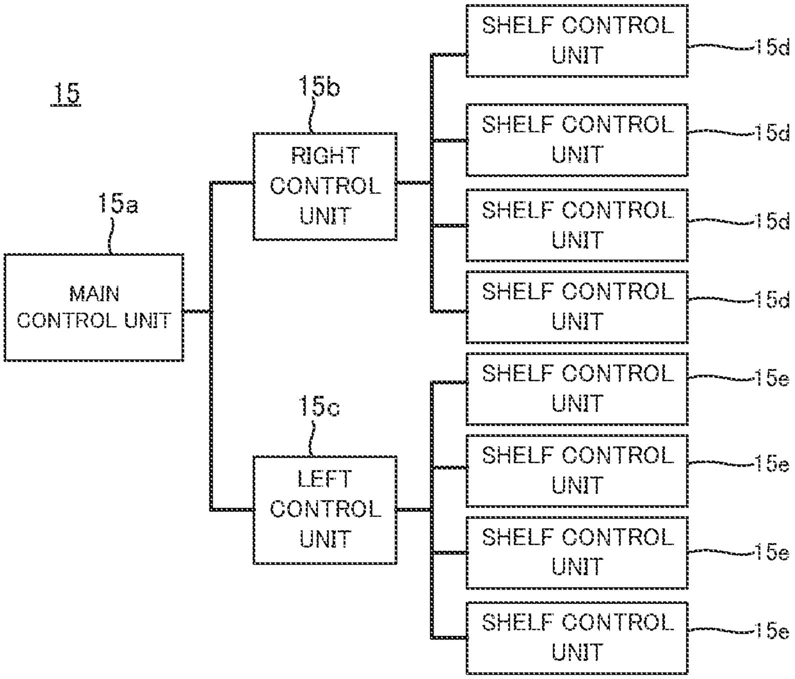
FIG. 7 is a diagram illustrating an ejection table.
FIG. 8 is a control device of a modification.

More specifically, control device 15 inputs the provisional number of ejections “4” as the number of ejections in the column of cassette number “1” corresponding to the group number “1” of the first group of ejection table T2 illustrated in FIG. 7. Ejection table T2 is temporarily generated in the memory unit when executing a program. The number of ejections associated with the drug name, the group number, and the cassette number is input to information table T1.

Further, at S34, control device 15 determines whether the number of ejections has been set to all cassettes C that perform the drug ejection operation. More specifically, control device 15 determines whether the number of ejections is set to cassettes C for the number of the allocated cassettes. The number of allocated cassettes of the first group related to “drug A” is “4” (see FIG. 5L), whereas the number of cassettes C provided with the number of ejections is 1. In this case (NO at S34), at S36, control device 15 updates the provisional number of ejections.

The update of the provisional number of ejections at S36 is performed as follows. First, control device 15 calculates the average value of the number of tablets to be ejected by cassette C provided with no number of ejections. Subsequently, an integer obtained by rounding up the decimal place of the calculated average value is determined. This integer is set as the provisional number of ejections after the update.

More specifically, the provisional number of ejections is updated as follows. In the first group, the number of tablets of “drug A” is “15” (see FIG. 5L), and “4” is set as the number of ejections of cassette C with the cassette number “1”, and accordingly the number of remaining tablets to be ejected by other cassettes C of the first group is “11” (=15-4). In addition, since the number of cassettes C provided with the number of ejections is 1 for the number of allocated cassettes “4”, and accordingly the number of remaining allocated cassettes is “3” (=4-1). Accordingly, the average value of the number of tablets to be ejected by cassettes C provided with no number of ejections is “3.6” (=11/3). Then, control device 15 updates the provisional number of ejections to "4", which is a value obtained by rounding up the decimal place of the calculated average value "3.6".

Subsequently, at S32, control device 15 inputs the provisional number of ejections "4" updated as the number of ejections, in the column of cassette number "2" corresponding to the group number "1" of the first group.

In this manner, when the number of ejections is set for all cassettes C for the number of allocated cassettes "4" in the first group by repeatedly executing S30 to S36 (YES at S34), control device 15 terminates the program. At the time point of the completion of the program for the first group, the number of ejections "4" is set to cassettes C with the cassette numbers "1" to "3", and the number of ejections "3" is set to cassette C with the cassette number "4" as illustrated in ejection table T2 of FIG. 7.

Next, control device 15 executes a program for the second group. At S30, control device 15 acquires the average value of the second group from information table T1, and sets a value obtained by rounding up the decimal place of the acquired average value as a provisional number of ejections. Since the "drug B" of the second group has an average value of "2.5" (see FIG. 5L), "3" as a value obtained by rounding up the decimal place is the provisional number of ejections.

Subsequently, at S32, control device 15 sets the number of ejections to one cassette C that performs the drug ejection operation in the second group. More specifically, control device 15 inputs the provisional number of ejections "3" as the number of ejections in the column of cassette number "1" corresponding to the group number "2" of the second group in ejection table T2.

Further, at S34, control device 15 determines whether the number of ejections has been set to all cassettes C that perform the drug ejection operation. The number of allocated cassettes of the second group related to "drug B" is "4" (see FIG. 5L), whereas the number of cassettes C provided with the number of ejections is 1. In this case (NO at S34), at S36, control device 15 updates the provisional number of ejections.

Since the number of ejections "3" is set for the number of tablets "10" of "drug B" (see FIG. 5L) in the second group, the number of remaining tablets is "7" (=10-3). In addition, since the number of cassettes C provided with the number of ejections is 1 for the number of allocated cassettes "4", the number of remaining allocated cassettes is "3" (=4-1). Accordingly, the average value of the number of tablets to be ejected by cassettes C provided with no number of ejections is "2.3" (=7/3). Then, control device 15 updates the provisional number of ejections to the calculated average value "3" as a value obtained by rounding up the decimal place of "2.3".

Subsequently, at S32, control device 15 inputs the provisional number of ejections "3" updated as the number of ejections, in the column of cassette number "2" corresponding to the group number "2" of the second group.

When control device 15 repeatedly executes S30 to S36 and the number of ejections is set for all cassettes C for the number of allocated cassettes "4" in the second group (YES at S34), the program is terminated. At the time point of the completion of the program for the second group, the number of ejections "3" is set to cassettes C with the cassette numbers "1" and "2", and the number of ejections "2" is set to the cassettes C with the cassette numbers "3" and "4" as illustrated in ejection table T2 of FIG. 7.

Next, control device 15 executes a program for the third group. At S30, control device 15 acquires the average value of the third group from information table T1, and sets a value obtained by rounding up the decimal place of the acquired average value as a provisional number of ejections. Since the "drug C" of the third group has an average value of "2.5" (see FIG. 5L), "3" as a value obtained by rounding up the decimal place is the provisional number of ejections.

Subsequently, at S32, control device 15 sets the number of ejections to one cassette C that performs the drug ejection operation in the third group. More specifically, control device 15 inputs the provisional number of ejections "3" as the number of ejections in the column of cassette number "1" corresponding to the group number "3" of the third group in ejection table T2.

Further, at S34, control device 15 determines whether the number of ejections has been set to all cassettes C that perform the drug ejection operation. The number of allocated cassettes of the third group related to "drug C" is "2" (see FIG. 5L), whereas the number of cassettes C provided with the number of ejections is 1. In this case (NO at S34), at S36, control device 15 updates the provisional number of ejections.

Since the number of ejections "3" is set for the number of tablets of "5" of "drug C" in the third group, the number of remaining tablets is "2" (=5-3). In addition, since the number of cassettes C provided with the number of ejections is 1 for the number of allocated cassettes "2", the number of remaining allocated cassettes is "1" (=2-1). Accordingly, the average value of the number of tablets to be ejected by cassettes C provided with no number of ejections is "2" (=2/1). Then, control device 15 updates the provisional number of ejections to "2", which is a value obtained by rounding up the decimal place of the calculated average value "2".

Subsequently, at S32, control device 15 inputs the provisional number of ejections "2" as the number of ejections in the column of cassette number "2" corresponding to the group number "3" of the third group.

In this manner, the number of ejections is set for all cassettes C for the number of allocated cassettes "2" in the third group. Then (YES at S34), the program is terminated. At the time point of the completion of the program for the third group, the number of ejections "3" is set to cassette C with the cassette number "1", and the number of ejections "2" is set to cassette C with the cassette number "2" as illustrated in ejection table T2 of FIG. 7.

At the time when the programs are completed for the all groups, the number of ejections is levelled in one of the plurality of groups for each of the plurality of groups. In addition, as described above, the average value is levelled among the plurality of groups. This means that control device 15 has selected cassette C that performs the drug ejection operation from each of the plurality of groups such that the number of tablets of the drug to be ejected from the plurality of cassettes C that perform the drug ejection operation is each levelled in one of the plurality of groups and among the plurality of groups.

On the other hand, for drugs not set to group, cassettes C for the number of types of the drugs not set to group are selected, and the number of tablets of the drug included in input drug information is set as the number of ejections as it is. More specifically, cassettes C in which "drug D", "drug E", "drug F", "drug G" and "drug H" are respectively stored are selected one by one, and the number of ejections "1" is set for each selected cassette C.

In this manner, on the basis of the input drug information, a plurality of cassettes C that perform the drug ejection operation is selected, and the number of ejections is set for each selected cassette C. At this time, the maximum number of times of the drug ejection operation of cassette C is the number of ejections “4” of cassettes C with the cassette numbers “1”, “2” and “3” of “drug A”. That is, the drug ejection time per package corresponds to the time for ejecting “drug A” four times. Accordingly, the drug ejection time per package is shorter than in the above-described case where the number of allocated cassettes is set to “1” and “drug A” is ejected 15 times. Thus, the time for supplying the drug can be reduced.

Note that the value included in the input drug information, the maximum number of cassettes C that can perform the drug ejection operation per package, the value input to information table T1, and the value input to ejection table T2 described above are examples, and naturally the above-described values are not limitative.

The present disclosure is not limited to the embodiments described so far. As long as the main purpose of this disclosure is not departed from, various modifications to this embodiment and embodiments constructed by combining elements in different embodiments are also included within the scope of this disclosure.

For example, control device 15 may determine all combinations of the number of cassettes C that perform the drug ejection operation and the number of tablets of the drug ejected by cassettes C that perform the drug ejection operation for each of the plurality of groups without calculating the average value in information table T1. Further, control device 15 may select a most levelled combination from the determined all combinations.

In addition, control device 15 may select cassette C that performs the drug ejection operation such that the remaining numbers of tablets of the drugs stored in the plurality of cassettes C are each levelled among one of the plurality of groups. More specifically, control device 15 repeatedly selects cassette C that performs the drug ejection operation in the order of cassette number. For example, in the above-described example, the drug information related to one package is input and cassettes C with the cassette numbers “1” and “2” in the third group are selected. Further, in the case where the drug information related to the next one package is input and the drug is ejected from the third group, control device 15 selects cassettes C that perform the drug ejection operation in the order of cassettes C with the cassette numbers “3”, “4” and “5” that have not performed the drug ejection operation last time. Note that since control device 15 can calculate the number of remaining drugs stored in cassette C as described above, control device 15 may select cassette C that performs the drug ejection operation in descending order of the number of remaining drugs in one of the plurality of groups. In this manner, the number of remaining drugs stored in cassettes C making up the group is levelled in each of the plurality of groups, and therefore the drug replenishing timing can be made approximately the same for the cassettes C making up the group. In addition, as described above, the number of tablets of the drug to be ejected from the plurality of cassettes C that perform the drug ejection operation is each levelled also among the plurality of groups, and thus the drug replenishing timing can be made approximately the same also among the plurality of groups.

In addition, control device 15 may select cassette C that performs the drug ejection operation using a larger number of tablets of the drug than that of cassette C that performs other drug ejection operation, from among the plurality of cassettes C stored in shelf 21 disposed closer to collection part 13 than other shelves 21 among the plurality of shelves 21. In the above-described example, cassettes C with the cassette numbers “1”, “2” and “3” of the first group eject the largest amount of drug. Accordingly, control device 15 selects cassettes C with the cassette numbers “1”, “2” and “3” of the first group from among the plurality of cassettes C stored in lowermost shelf 21 located closest to collection part 13. In addition, control device 15 may select cassette C stored in shelf 21 closest to outlet 13*a* of collection part 13 among the plurality of shelves 21 located lowermost. More specifically, since outlet 13*a* is located at the center of collection part 13 in the left-right direction, control device 15 selects cassette C stored in shelf 21 disposed at the center in the left-right direction. In this manner, the distance between outlet 13*a* and cassette C that performs the drug ejection operation, and in turn the migration length of the ejected drug can be reduced. Thus, the time for supplying the drug can be reduced.

In addition, control device 15 may generate an alarm when the number of remaining drugs stored in one cassette C becomes equal to or smaller than a predetermined number of tablets. In this manner, in the case where cassette C where the number of remaining drugs becomes equal to or smaller than a predetermined number of tablets makes up a group, the drug can be supplied to other cassettes C making up the group in a timely manner. In addition, by replacing all drugs for cassettes C making up the group, mixture of drugs of different lots in one package can be prevented.

In addition, control device 15 may continuously select one cassette C until all the drug stored is consumed, and may select another cassette C storing the drug of the same type as the consumed drug when all the drug stored in one cassette C is consumed.

In addition, as illustrated in FIG. 8, control device 15 may include main control unit 15*a*, right control unit 15*b*, left control unit 15*c*, and shelf control units 15*d* and 15*e* disposed in each shelf 21. Note that FIG. 8 illustrates a total of eight shelf control units 15*d* and 15*e* for convenience of illustration, the total number of shelf control units 15*d* and 15*e* is the same as the total number of shelves 21

Main control unit 15*a* acquires information input to the input unit, and controls right control unit 15*b* and left control unit 15*c* on the basis of the acquired information. Main control unit 15*a* includes a memory unit (not illustrated in the drawing). Right control unit 15*b* controls shelf control unit 15*d* disposed in shelf 21 on the right side in the second floor section on the basis of the acquired information. Left control unit 15*c* controls shelf control unit 15*e* disposed in shelf 21 on the left side in the second floor section on the basis of the acquired information. Shelf control units 15*d* and 15*e* controls the drug ejection operation of the plurality of cassettes C stored in shelf 21 on the basis of the acquired information.

Cassette C that performs the drug ejection operation is selected by main control unit 15*a*. When causing cassette C stored in shelf 21 disposed on the right side to perform the drug ejection operation, main control unit 15*a* transmits a control command value to right control unit 15*b*. On the basis of the transmitted control command value, right control unit 15*b* transmits the control command value to shelf control unit 15*d* disposed in shelf 21 in which cassette C that performs the drug ejection operation is stored. Shelf control unit 15*d* to which the control command value is transmitted causes cassette C to perform the drug ejection operation on the basis of the control command value. In this case, main control unit 15*a* selects cassette C that performs the drug ejection operation so as to reduce the number of shelves 21 in which cassette C that perform the drug ejection operation is stored. As the number of shelves 21 in which cassette C that performs the drug ejection operation is stored decreases, the number of shelf control units 15*d* and 15*e* that control cassettes C decreases, and thus the efficiency of the process in control device 15 is improved. Thus, the time for supplying the drug can be reduced.

This application is entitled to and claims the benefit of Japanese Patent Application No. 2020-179599 filed on Oct. 27, 2020, the disclosure each of which including the specification, drawings and abstract is incorporated herein by reference in its entirety.

INDUSTRIAL APPLICABILITY

The present disclosure is widely applicable to drug supply devices.

REFERENCE SIGNS LIST

1 Drug supply device
13 Collection part
15 Control device
21 Shelf
C Cassette

The invention claimed is:

1. A drug supply device comprising:

a plurality of cassettes configured to eject a drug one by one, wherein the plurality of cassettes comprises a plurality of groups, each of the plurality of groups includes one or more cassettes, each of the plurality groups is configured to eject one type of drug, and the plurality of groups are configured to eject different types of drugs from each other;

a plurality of shelves storing the plurality of cassettes; and a control device, wherein the control device includes a program and a memory storing the program, when a medical prescription is input to the drug supply device, the control device is configured, by executing the program, to:

allocate cassettes for each drug in the medical prescription, and input the medical prescription to an information table generated by the executed program, wherein the medical prescription includes drug names and number of tablets of each drug, wherein the information table generated by the executed program includes the drug names in the medical prescription, the number of tablets of each drug in the medical prescription, group number of each drug in the medical prescription, maximum number of cassettes for each drug in the medical prescription, number of allocated cassettes of each drug in the medical prescription, and an average value of tablets of each drug ejected by each of the allocated cassettes, wherein in the information table, the number of allocated cassettes of each drug in the medical prescription is preset as 1 and the average value of tablets of each drug ejected by each of the allocated cassettes is the number of tablets of each drug in the medical prescription divided by the number of allocated cassettes of the corresponding drug in the medical prescription, and wherein the control device is configured, by executing the program, to execute:

step (1) calculating the average value of tablets of each drug ejected by each of the allocated cassettes; and step (2) sorting the plurality of groups in a descending order of the average value of tablets of each drug ejected by each of the allocated cassettes in the information table, such that first group in the information table has the largest average value of tablets among the plurality of groups.

2. The drug supply device according to claim 1, further comprising:

a collection part disposed below the plurality of shelves and configured to collect the drugs ejected from the cassettes.

3. The drug supply device according to claim 1, wherein the control device is configured, by executing the program, to execute step (3) determining whether the number of allocated cassettes in the first group is smaller than the maximum number of cassettes for the first group, if the number of allocated cassettes in the first group is smaller than the maximum number of cassettes for the first group, the control device is configured, by executing the program, to execute:

step (4) increasing the number of allocated cassettes in the first group by 1, step (5) calculating the average value of tablets of the first group, and step (6) determining whether a total number of allocated cassettes for all drugs in the medical prescription is smaller than a number of usable cassettes, wherein the number of usable cassettes is the cassettes available for use for all drugs in the medical prescription, if the total number of allocated cassettes for all drugs in the medical prescription is smaller than the number of usable cassettes, the control device is configured, by executing the program, to repeat step (2), step (3), step (4), step (5) and step (6), until the number of allocated cassettes in the first group is not smaller than the maximum number of cassettes for the first group or the total number of allocated cassettes for all drugs in the medical prescription is not smaller than the number of usable cassettes.

4. The drug supply device according to claim 3, wherein when the number of allocated cassettes in the first group is not smaller than the maximum number of cassettes for the first group and the total number of allocated cassettes for all drugs in the medical prescription is smaller than the number of usable cassettes, the control device is configured, by executing the program, to execute step (7) determining whether a number of allocated cassettes in a next group is smaller than a maximum number of cassettes for the next group, if the number of allocated cassettes in the next group is smaller than the maximum number of cassettes for the next group, the control device is configured, by executing the program, to execute:

step (8) increasing the number of allocated cassettes in the next group by 1, step (9) calculating the average value of tablets of the next group, and step (10) determining whether a total number of allocated cassettes for all drugs in the medical prescription is smaller than the number of usable cassettes, if the total number of allocated cassettes for all drugs in the medical prescription is smaller than the number of usable cassettes, the control device is configured, by executing the program, to repeat step (2), step (3), step (4), step (5) and step (6), until the number of allocated cassettes for each of the plurality of groups is not smaller than the maximum number of cassettes or the total number of allocated cassettes for all drugs in the medical prescription is not smaller than the number of usable cassettes.

5. The drug supply device according to claim 4, wherein when the number of allocated cassettes for each of the plurality of groups is not smaller than the maximum number of cassettes or the total number of allocated cassettes for all drugs in the medical prescription is not smaller than the number of usable cassettes whichever is satisfied first, the control device is configured, by executing the program, to terminate allocating cassettes for each drug in the medical prescription.

6. A drug supply method comprising:

step (i) receiving information, by a control device, with respect to drugs to be packaged, wherein the information comprises a medical prescription including drug names and number of tablets of each drug; and step (ii) grouping a plurality of cassettes to be used into a plurality of groups based on the information by the control device, wherein each of the plurality of groups includes one or more cassettes, each of the plurality groups is configured to eject one type of drug, the plurality of groups are configured to eject different types of drugs from each other, and each of the plurality of cassettes are configured to eject the corresponding drug one by one, wherein the control device includes a program and a memory storing the program, wherein the step (ii) grouping a plurality of cassettes to be used into a plurality of groups includes:

step (a) allocating cassettes for each drug in the medical prescription;

step (b) inputting the medical prescription to an information table generated by the program;

step (1) calculating an average value of tablets of each drug ejected by each of the allocated cassettes; and step (2) sorting the plurality of groups in a descending order of the average value of tablets of each drug ejected by each of the allocated cassettes in the information table, such that first group in the information table has the largest average value of tablets among the plurality of groups, wherein the information table generated by the program includes the drug names in the medical prescription, the number of tablets of each drug in the medical prescription, group number of each drug in the medical prescription, maximum number of cassettes for each drug in the medical prescription, number of allocated cassettes of each drug in the medical prescription, and the average value of tablets of each drug ejected by each of the allocated cassettes.

7. The drug supply method according to claim 6, wherein the step (ii) grouping a plurality of cassettes to be used into a plurality of groups includes:

step (3) determining whether the number of allocated cassettes in the first group is smaller than the maximum number of cassettes for the first group, if the number of allocated cassettes in the first group is smaller than the maximum number of cassettes for the first group, the step (ii) grouping a plurality of cassettes to be used into a plurality of groups further includes:

step (4) increasing the number of allocated cassettes in the first group by 1;

step (5) calculating the average value of tablets of the first group; and step (6) determining whether a total number of allocated cassettes for all drugs in the medical prescription is smaller than a number of usable cassettes, wherein the number of usable cassettes is the cassettes available for use for all drugs in the medical prescription, if the total number of allocated cassettes for all drugs in the medical prescription is smaller than the number of usable cassettes, repeating step (2), step (3), step (4), step (5) and step (6), until the number of allocated cassettes in the first group is not smaller than the maximum number of cassettes for the first group or the total number of allocated cassettes for all drugs in the medical prescription is not smaller than the number of usable cassettes.

8. The drug supply method according to claim 7, wherein when the number of allocated cassettes in the first group is not smaller than the maximum number of cassettes for the first group and the total number of allocated cassettes for all drugs in the medical prescription is smaller than the number of usable cassettes, the step (ii) grouping a plurality of cassettes to be used into a plurality of groups further includes:

step (7) determining whether a number of allocated cassettes in a next group is smaller than a maximum number of cassettes for the next group, if the number of allocated cassettes in the next group is smaller than the maximum number of cassettes for the next group, the step (ii) grouping a plurality of cassettes to be used into a plurality of groups further includes:

step (8) increasing the number of allocated cassettes in the next group by 1;

step (9) calculating the average value of tablets of the next group; and step (10) determining whether a total number of allocated cassettes for all drugs in the medical prescription is smaller than the number of usable cassettes, if the total number of allocated cassettes for all drugs in the medical prescription is smaller than the number of usable cassettes, the step (ii) grouping a plurality of cassettes to be used into a plurality of groups further includes:

repeating step (2), step (3), step (4), step (5) and step (6), until the number of allocated cassettes for each of the plurality of groups is not smaller than the maximum number of cassettes or the total number of allocated cassettes for all drugs in the medical prescription is not smaller than the number of usable cassettes.

9. The drug supply method according to claim 8, comprising:

terminating allocating cassettes for each drug in the medical prescription, when the number of allocated cassettes for each of the plurality of groups is not smaller than the maximum number of cassettes or the total number of allocated cassettes for all drugs in the medical prescription is not smaller than the number of usable cassettes whichever is satisfied first.

* * * * *